(12) United States Patent
Sima et al.

(10) Patent No.: US 12,254,552 B1
(45) Date of Patent: Mar. 18, 2025

(54) AUDIO-DRIVEN THREE-DIMENSIONAL FACIAL ANIMATION MODEL GENERATION METHOD AND APPARATUS, AND ELECTRONIC DEVICE

(71) Applicant: NANJING SILICON INTELLIGENCE TECHNOLOGY CO., LTD., Jiangsu (CN)

(72) Inventors: Huapeng Sima, Jiangsu (CN); Zheng Liao, Jiangsu (CN)

(73) Assignee: NANJING SILICON INTELLIGENCE TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/999,832

(22) Filed: Dec. 23, 2024

(30) Foreign Application Priority Data

Dec. 29, 2023 (CN) .......................... 202311870903.0

(51) Int. Cl.
G06T 13/40 (2011.01)
G06T 13/20 (2011.01)
G06T 17/00 (2006.01)

(52) U.S. Cl.
CPC ............ *G06T 13/40* (2013.01); *G06T 13/205* (2013.01); *G06T 17/00* (2013.01)

(58) Field of Classification Search
None
See application file for complete search history.

(56) References Cited

U.S. PATENT DOCUMENTS

| | | | |
|---|---|---|---|
| 2022/0076470 A1 | 3/2022 | Yang | |
| 2023/0215068 A1* | 7/2023 | Sima | G10L 15/22 345/474 |
| 2024/0013462 A1* | 1/2024 | Seol | G06T 13/40 |

FOREIGN PATENT DOCUMENTS

| | | |
|---|---|---|
| CN | 111667045 A | 9/2020 |
| CN | 112396182 A | 2/2021 |

(Continued)

OTHER PUBLICATIONS

Dai et al., Survey of Research Progress of Video Tracking Based on Deep Learning, Computer Engineering and Applications, Mar. 2019, vol. 55, No. 10, p. 16-29, and its English abstract, 14 pages.

(Continued)

*Primary Examiner* — Peter Hoang
(74) *Attorney, Agent, or Firm* — Bret E. Field; Bozicevic, Field & Francis LLP

(57) ABSTRACT

This application provides a audio-driven three-dimensional facial animation model generation method and apparatus, and an electronic device. The method includes: acquiring sample data including sample audio data, sample speaking style data, and a sample blend shape value; performing feature extraction on the sample audio data to obtain a sample audio feature; performing convolution on the sample audio feature based on a to-be-trained audio-driven three-dimensional facial animation model to obtain an initial audio feature, and performing encoding on the sample speaking style data based on the to-be-trained audio-driven three-dimensional facial animation model to obtain a sample speaking style feature; performing encoding on the initial audio feature and the sample speaking style feature based on the to-be-trained audio-driven three-dimensional facial animation model, to obtain an output blend shape value; and (Continued)

performing calculation on the sample blend shape value and the output blend shape value to obtain a loss function value.

8 Claims, 7 Drawing Sheets

(56) References Cited

FOREIGN PATENT DOCUMENTS

| | | |
|---|---|---|
| CN | 113257279 A | 8/2021 |
| CN | 113592985 A | 11/2021 |
| CN | 115272537 A | 11/2022 |
| CN | 116309988 A | 6/2023 |
| CN | 117115316 A | 11/2023 |

OTHER PUBLICATIONS

Yang et al., Speech-Driven Video-Realistic Talking Head Synthesis Using BLSTM-RNN, Journal of Tsinghua University (Natural Science Edition), Mar. 2017, vol. 57, No. 3, p. 250-256, and its English abstract, 7 pages.

* cited by examiner

AUDIO-DRIVEN THREE-DIMENSIONAL FACIAL ANIMATION MODEL GENERATION METHOD AND APPARATUS, AND ELECTRONIC DEVICE

CROSS-REFERENCE TO RELATED APPLICATIONS

The present application claims priority to Chinese Patent Application No. 2023118709030, filed on Dec. 29, 2023, the entire disclosure of which is expressly incorporated by reference in its entirety herein.

FIELD OF THE INVENTION

The present application relates to the technical field of audio processing, and in particular, to an audio-driven three-dimensional facial animation model generation method and apparatus, and an electronic device.

BACKGROUND OF THE INVENTION

Research on speech-driven expression technologies is an important part of the field of natural human-machine interaction. Specifically, a digital image is driven through speech to express corresponding speech content by facial expressions corresponding to the speech, thus generating corresponding animations. Core of the speech-driven expression technologies lies in calculation and output of a blend shape value (BS value for short). Specifically, a user-recorded or TTS-synthesized speech is preprocessed to output a BS value, which may be used to drive the digital image to generate facial expression animations corresponding to the speech, and then the facial expression animations are displayed on various display devices through a rendering technology.

In related technologies, in production processes of works such as animations and movie and television works, it is often needed to modify lines at a later stage, but a phenomenon of audio-visual asynchrony due to line modification may seriously reduce effects of the movie and television works. Therefore, in the related technologies, re-shooting or post-production with rendering are adopted for processing, all of which have a problem of extremely high costs. To overcome the foregoing problem, in the related technologies, the lines may be modified by an audio-driven three-dimensional facial animation technology, that is, an original image is driven by audio corresponding to the modified lines, so as to generate facial expression animations corresponding to the modified lines.

However, a BS value output by the foregoing speech-driven expression technologies has a series of problems, such as mismatch between lip-sync actions and speech and poor naturalness of expression actions, which reduces accuracy of the audio-driven three-dimensional facial animation technology.

SUMMARY OF THE INVENTION

To resolve the foregoing technical problem, embodiments of the present application provide an audio-driven three-dimensional facial animation model generation method and apparatus, and an electronic device, which can improve accuracy of an audio-driven three-dimensional facial animation technology. Technical solutions are as follows.

According to a first aspect of an embodiment of the present application, an audio-driven three-dimensional facial animation model generation method is provided. The method includes:
    acquiring sample data, where the sample data includes sample audio data, sample speaking style data, and a sample blend shape value, the sample audio data and the sample speaking style data belong to a same user, the sample speaking style data is used for representing a facial expression of the user, and the sample blend shape value is obtained by preprocessing the sample audio data;
    performing feature extraction on the sample audio data to obtain a sample audio feature;
    performing convolution on the sample audio feature based on a to-be-trained audio-driven three-dimensional facial animation model to obtain an initial audio feature, and performing encoding on the sample speaking style data based on the to-be-trained audio-driven three-dimensional facial animation model to obtain a sample speaking style feature;
    performing encoding on the initial audio feature and the sample speaking style feature based on the to-be-trained audio-driven three-dimensional facial animation model to obtain an output blend shape value;
    performing calculation on the sample blend shape value and the output blend shape value to obtain a loss function value; and
    updating a model parameter of the to-be-trained audio-driven three-dimensional facial animation model based on the loss function value.

In a possible implementation of the first aspect, the performing feature extraction on the sample audio data to obtain a sample audio feature includes:
    performing feature extraction on the sample audio data based on a preset model, wherein a feature from an intermediate layer of the preset model is used as the sample audio feature.

In a possible implementation of the first aspect, the performing convolution on the sample audio feature based on a to-be-trained audio-driven three-dimensional facial animation model to obtain an initial audio feature includes:
    performing convolution on the sample audio feature based on the to-be-trained audio-driven three-dimensional facial animation model to obtain at least one intermediate audio feature; and
    performing interval calculation on the at least one intermediate audio feature to obtain the initial audio feature.

In a possible implementation of the first aspect, the performing interval calculation on the at least one intermediate audio feature to obtain the initial audio feature includes:
    matching every two intermediate audio features in the at least one intermediate audio feature based on the to-be-trained audio-driven three-dimensional facial animation model to obtain an intermediate audio feature group corresponding to every two intermediate audio features in the at least one intermediate audio feature, where each intermediate audio feature in the at least one intermediate audio feature corresponds to one convolutional calculation channel, and sequence values of two convolutional calculation channels corresponding to the intermediate audio feature group are not adjacent to each other;
    merging two intermediate audio features in each intermediate audio feature group in at least one intermediate audio feature group based on the to-be-trained audio-driven three-dimensional facial animation model to obtain an intermediate merged feature corresponding to each intermediate audio feature group in the at least one intermediate audio feature group; and performing calculation on each intermediate merged feature in at least one intermediate merged feature based on the to-be-trained audio-driven three-dimensional facial animation model to obtain the initial audio feature.

In a possible implementation of the first aspect, the performing encoding on the sample speaking style data based on the to-be-trained audio-driven three-dimensional facial animation model to obtain a sample speaking style feature includes:

performing one-hot encoding on the sample speaking style data based on the to-be-trained audio-driven three-dimensional facial animation model to obtain the sample speaking style feature.

In a possible implementation of the first aspect, the performing encoding on the initial audio feature and the sample speaking style feature based on the to-be-trained audio-driven three-dimensional facial animation model to obtain an output blend shape value includes:

overlaying the sample audio feature and the sample speaking style feature based on the to-be-trained audio-driven three-dimensional facial animation model to obtain a sample overlay feature; and performing encoding on the sample overlay feature based on the to-be-trained audio-driven three-dimensional facial animation model to obtain the output blend shape value.

In a possible implementation of the first aspect, the performing encoding on the sample overlay feature based on the to-be-trained audio-driven three-dimensional facial animation model to obtain the output blend shape value includes:

performing encoding on the sample overlay feature based on the to-be-trained audio-driven three-dimensional facial animation model to obtain a sample encoding feature; and performing decoding on the sample encoding feature based on the to-be-trained audio-driven three-dimensional facial animation model to obtain the output blend shape value.

According to a second aspect of an embodiment of the present application, an audio-driven three-dimensional facial animation model generation apparatus is provided. The apparatus includes:

an acquirement module, configured to acquire sample data, where the sample data includes sample audio data, sample speaking style data, and a sample blend shape value, the sample audio data and the sample speaking style data belong to a same user, the sample speaking style data is used for representing a facial expression of the user, and the sample blend shape value is obtained by preprocessing the sample audio data;

a feature extraction module, configured to perform feature extraction on the sample audio data to obtain a sample audio feature;

a first training module, configured to perform convolution on the sample audio feature based on a to-be-trained audio-driven three-dimensional facial animation model to obtain an initial audio feature, and perform encoding on the sample speaking style data based on the to-be-trained audio-driven three-dimensional facial animation model to obtain a sample speaking style feature;

a second training module, configured to perform encoding on the initial audio feature and the sample speaking style feature based on the to-be-trained audio-driven three-dimensional facial animation model to obtain an output blend shape value;

a calculation module, configured to perform calculation on the sample blend shape value and the output blend shape value to obtain a loss function value; and an update module, configured to update a model parameter of the to-be-trained audio-driven three-dimensional facial animation model based on the loss function value.

In a possible implementation of the second aspect, the feature extraction module includes:

a feature extraction unit, configured to perform feature extraction on the sample audio data based on a preset model, wherein a feature from an intermediate layer of the preset model is used as the sample audio feature.

In a possible implementation of the second aspect, the first training module includes:

a convolution unit, configured to perform convolution on the sample audio feature based on the to-be-trained audio-driven three-dimensional facial animation model to obtain at least one intermediate audio feature; and an interval calculation unit, configured to perform interval calculation on the at least one intermediate audio feature to obtain the initial audio feature.

In a possible implementation of the second aspect, the interval calculation unit includes:

a first matching subunit, configured to match every two intermediate audio features in the at least one intermediate audio feature based on the to-be-trained audio-driven three-dimensional facial animation model to obtain an intermediate audio feature group corresponding to every two intermediate audio features in the at least one intermediate audio feature, where each intermediate audio feature in the at least one intermediate audio feature corresponds to one convolutional calculation channel, and sequence values of two convolutional calculation channels corresponding to the intermediate audio feature group are not adjacent to each other;

a merging subunit, configured to merge two intermediate audio features in each intermediate audio feature group in at least one intermediate audio feature group based on the to-be-trained audio-driven three-dimensional facial animation model to obtain an intermediate merged feature corresponding to each intermediate audio feature group in the at least one intermediate audio feature group; and a calculation subunit, configured to perform calculation on each intermediate merged feature in at least one intermediate merged feature based on the to-be-trained audio-driven three-dimensional facial animation model to obtain the initial audio feature.

In a possible implementation of the second aspect, the first training module includes:

a one-hot encoding module, configured to perform one-hot encoding on the sample speaking style data based on the to-be-trained audio-driven three-dimensional facial animation model to obtain the sample speaking style feature.

In a possible implementation of the second aspect, the second training module includes:

an overlaying unit, configured to overlay the sample audio feature and the sample speaking style feature based on the to-be-trained audio-driven three-dimensional facial animation model to obtain a sample overlay feature; and an encoding unit, configured to perform encoding on the sample overlay feature based on the to-be-trained audio-driven three-dimensional facial animation model to obtain the output blend shape value.

In a possible implementation of the second aspect, the encoding unit includes:

an encoding subunit, configured to perform encoding on the sample overlay feature based on the to-be-trained audio-driven three-dimensional facial animation model to obtain a sample encoding feature; and a decoding subunit, configured to perform decoding on the sample encoding feature based on the to-be-trained audio-driven three-dimensional facial animation model to obtain the output blend shape value.

According to a third aspect of an embodiment of the present application, an electronic device is provided. The electronic device includes a processor and a memory, where the memory is configured to store at least one program, and the at least one program is loaded by the processor to implement the audio-driven three-dimensional facial animation model generation method according to the first aspect.

According to a fourth aspect of an embodiment of the present application, a computer readable storage medium is provided. The computer readable storage medium stores at least one program, and the at least one program is loaded and executed by a processor to implement the audio-driven three-dimensional facial animation model generation method according to the first aspect.

According to a fifth aspect of an embodiment of the present application, a computer program product including computer instructions is provided. When the computer program instructions are running on an electronic device, the electronic device is enabled to implement the audio-driven three-dimensional facial animation model generation method according to the first aspect.

In the present application, the foregoing names do not constitute specific limitations on devices or functional modules. In practical implementation, these devices or functional modules may have other names, provided that functions of each device or functional module are similar to those in the present application, and fall within the scope of the claims and equivalent technologies of the claims of the present application.

These or other aspects of the present application are more concise and understandable according to the following description.

In the embodiments of the present application, an embodiment of the present application provides an audio-driven three-dimensional facial animation model generation method. The sample data of the user is obtained, including the sample audio data, the sample speaking style data, and the sample blend shape value corresponding to the sample audio data. The sample speaking style data represents facial expression data of the user, so as to merge personalisation data of the user with the sample audio data and preserve the personalisation data of the user as possible. The to-be-trained audio-driven three-dimensional facial animation model is trained based on the sample data. The obtained audio-driven three-dimensional facial animation model that has been trained can output a high-accuracy BS value, thereby improving the accuracy of the audio-driven three-dimensional facial animation technology. In addition, inputting the output high-accuracy BS value into a preset unreal engine enables the preset unreal engine to render high-accuracy lip-syncs and facial expressions onto a video display device, thereby achieving high-accuracy reproduction of both lip-syncs and facial expressions. In this way, the audio-driven three-dimensional facial animation technology can be widely applied to scenes having high requirements on expression accuracy, such as production of movie and television works.

BRIEF DESCRIPTION OF THE DRAWINGS

To describe the technical solutions in the description of the embodiments of the present application to be more clear, the accompanying drawings for the embodiments are briefly described below. Apparently, the accompanying drawings according to the description below are merely for some of embodiments of the present application, and other accompanying drawings may also be derivable by one of ordinary skills in the art according to these accompanying drawings without an effective effort.

DETAILED DESCRIPTION OF THE EMBODIMENTS

To make objectives, technical solutions, and advantages of the present application clearer, the implementations of the present application are further described in detail with reference to the accompanying drawings.

Exemplary embodiments are described below in detail, and examples thereof are shown in the accompanying drawings. When the descriptions below relate to the accompanying drawings, unless otherwise stated, same numbers throughout accompanying drawings indicate same or similar elements. Implementations described in the following exemplary embodiments do not represent all of implementations consistent with the present application. On the contrary, these implementations are only examples of an apparatus and a method that are described in detail in the claims and in accordance with some aspects of the present application.

Terms "first" and "second" used in the present application are used to distinguish between identical or similar items that have essentially the same effects and functions. It should be understood that there is no logical or temporal dependency between "first", "second", and "nth", which do not limit quantities and execution orders. It should also be understood that although the terms such as first and second are used in the following description to describe various elements, these elements should not be limited by the terms.

These terms are merely used to distinguish between one element and another element. For example, a first action may be referred to as a second action, and similarly, the second action may also be referred to as the first action, without departing from the scope of various examples. The first action and the second action may both be actions, and in some cases, may be separate and different actions.

Meanwhile, at least one means one or more. For example, at least one action may represent any integer number of actions, such as one action, two actions, or three actions, where the integer number is greater than or equal to one. "A plurality of" means two or more. For example, a plurality of actions may be any integer number of actions, such as two actions or three actions, where the integer number is greater than or equal to two.

It should be noted that data (including but not limited to training data and prediction data, such as user data and terminal-side data) and signals involved in the present application are all authorized by a user or are fully authorized by all parties, and collection, use, and processing of relevant data need to comply with relevant laws, regulations, and standards of relevant countries and regions.

Figure 1:
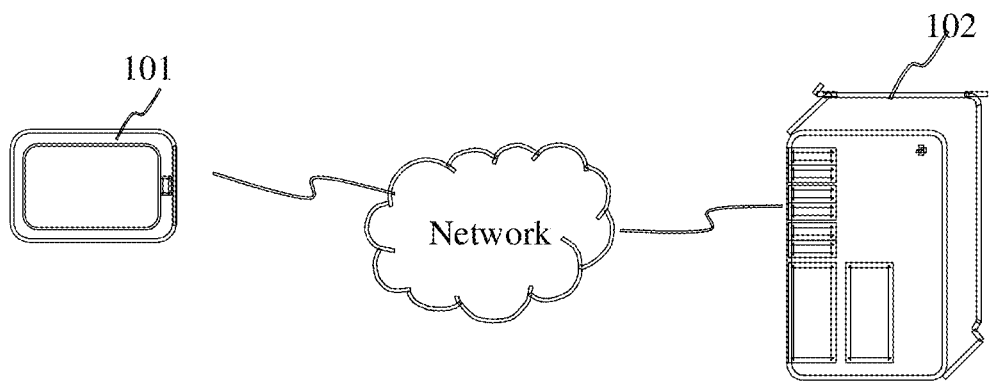
FIG. 1 is a schematic diagram of an implementation environment according to an embodiment of the present application.

FIG. 1 is a schematic diagram of an implementation environment according to an embodiment of the present application. The implementation environment may include a terminal 101 and a server 102.

An audio receiving device and a video display device are disposed in the terminal 101. The audio receiving device and the video display device may be separate devices, or may be integrated on one hardware device, in which a sound receiving function is integrated with an animation display function, such as an LED (light emitting diode) screen having a speech recognition function. The terminal 101 may include a wearable device, a personal computer, a laptop, a tablet, a smart television, a vehicle-mounted terminal and the like.

The server 102 may be a single server, a server cluster including a plurality of servers, or a cloud processing center.

The terminal 101 is connected to the server 102 through a wired or wireless network.

In some embodiments, the wireless or wired network uses a standard communication technology and/or protocol. The network is typically the Internet, but may also be any other network, including but not limited to a local area network (LAN), a metropolitan area networks (MAN), a wide area network (MAN), a mobile network, a wired or wireless network, a private network, or any combination of virtual private networks. In some embodiments, technologies and/or formats including the hyper text mark-up language (HTML), the extensible markup language (XML), and the like may be used to represent data exchanged through a network. In addition, conventional encryption technologies such as a secure socket layer (SSL), transport layer security (TLS), a virtual private network (VPN), and Internet protocol security (IPsec) may be used to encrypt all or some links. In some other embodiments, customized and/or private data communication technologies may also be used to replace or supplement the foregoing data communication technologies.

Figure 2A:
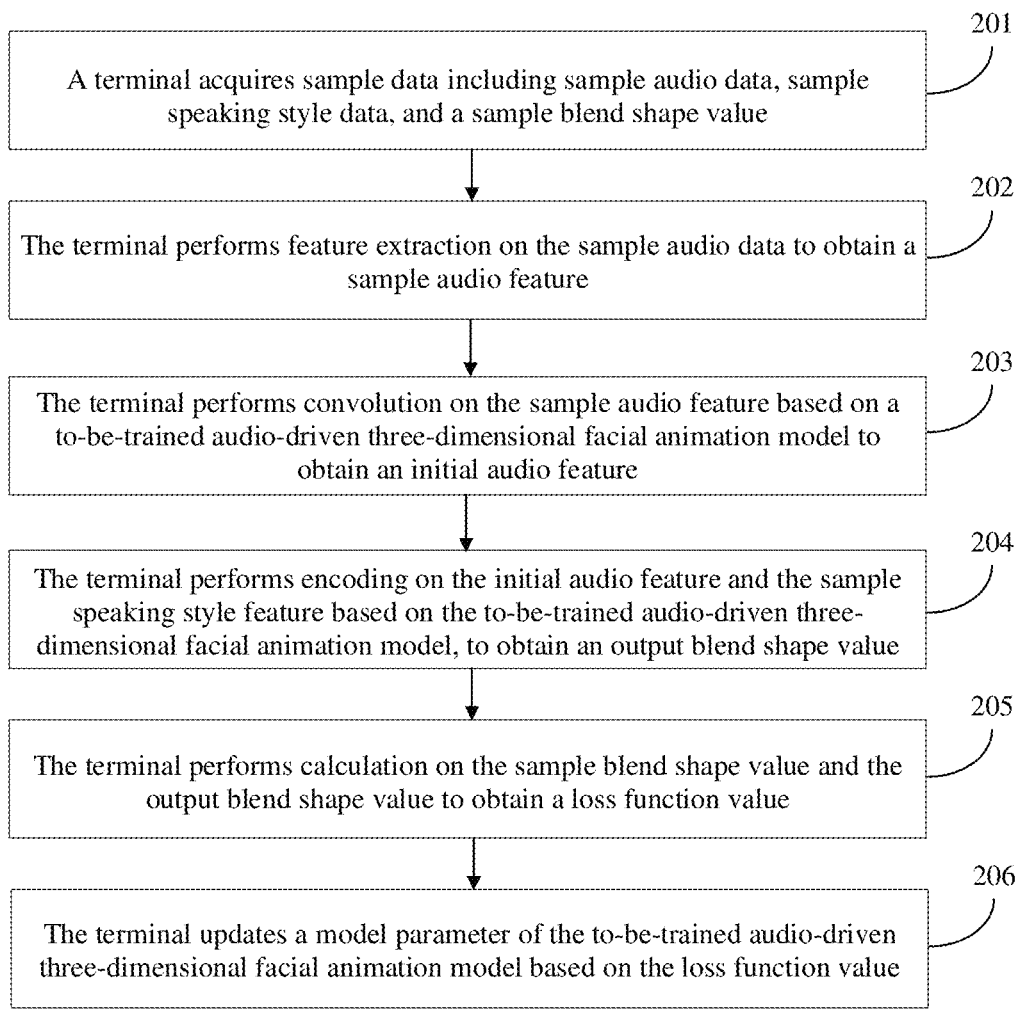
FIG. 2A is a schematic flowchart of an audio-driven three-dimensional facial animation model generation method according to an embodiment of the present application.

FIG. 2A is a schematic flowchart of an audio-driven three-dimensional facial animation model generation method according to an embodiment of the present application. As shown in FIG. 2A, in the embodiments of the present application, description is made based on an example in which the method is applied to an audio receiving device and a video display device. The method includes the following steps.

Step 201. A terminal acquires sample data, where the sample data includes sample audio data, sample speaking style data, and a sample blend shape value, where the sample audio data and the sample speaking style data belong to a same user, the sample speaking style data being used for representing a facial expression of the user, and the sample blend shape value being obtained by preprocessing the sample audio data.

It should be noted that, in some embodiments, the blend shape value may also be referred to as a BS value.

Figure 2B:
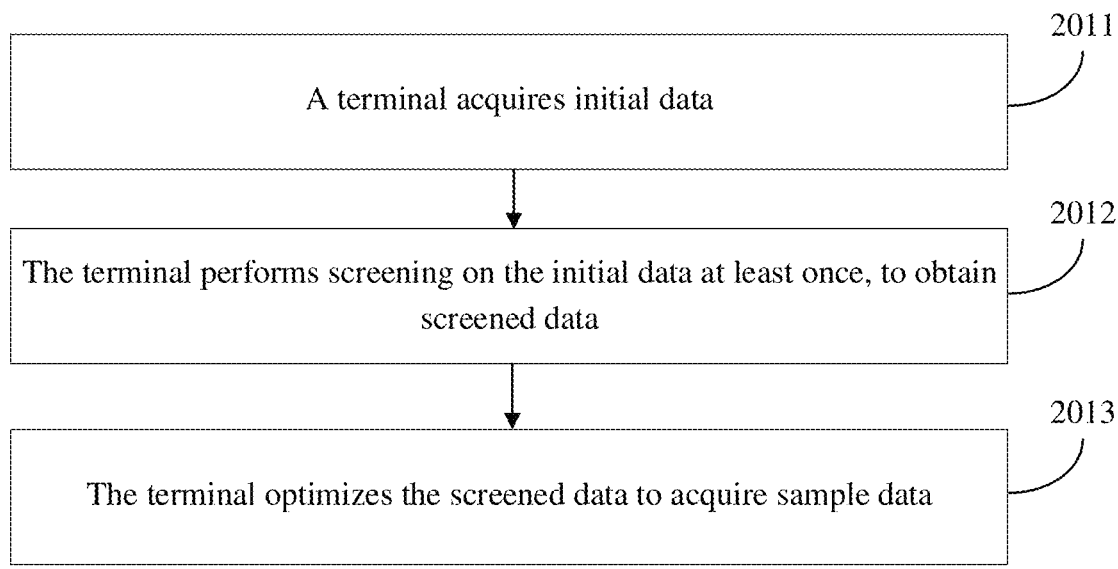
FIG. 2B is a first exemplary schematic flowchart of an audio-driven three-dimensional facial animation model generation method according to an embodiment of the present application.

In some embodiments, as shown in FIG. 2B, step 201 includes the following steps.

Step 2011. The terminal acquires initial data.

In some embodiments, at least one (such as 100) fixed speechcraft sample is preset and is allocated to at least one user, so that each of the at least one user reads, to a data acquisition device, the speechcraft sample allocated thereto and expresses a preset facial expression in a same environment, and then acquires the initial data by the data collection device.

In some embodiments, the terminal performs real-time facial capture on each of the at least one user based on structured light in the data collection device and a built-in augmented reality development platform, to acquire at least one frame image corresponding to each of the at least one user, each frame image in the at least one frame image being used for representing the corresponding facial expression of the user, and to acquire and record audio and at least one BS value corresponding to each frame image in the at least one frame image. Each frame image in the at least one frame image, and the audio and at least one BS value corresponding to each frame image in the at least one frame image are used as the initial data. In other words, at least one piece of initial data may be acquired by the data collection device. The data collection device is not specifically limited in the embodiments of the present application.

Optionally, any one of the at least one BS value may be acquired according to the following manner: blending the audio to obtain a relative proportion or weight between audio signals, as the BS value.

It should be noted that the audio may be blended according to a conventional algorithm to obtain the BS value corresponding to the audio. A specific blending process is not described in the embodiments of the present application.

Step 2012. The terminal performs screening on the initial data at least once, to obtain screened data.

In some embodiments, the screening is performed on the obtained initial data based on preset parameters such as an environmental error and/or a user error, and at least one frame image with the user error and/or the environmental error is deleted, and meanwhile, audio and a BS value corresponding to the at least one frame image are also deleted, so as to obtain high-quality screened data.

Step 2013. The terminal optimizes the screened data to acquire sample data.

In some embodiments, some images that do not accurately express the facial expressions of the user are adjusted by means of animation production, so as to be optimized, thereby to obtain sample facial expression data that expresses the facial expressions more accurately. The sample speaking style data is obtained based on the sample facial expression data, so as to acquire sample data that is relatively more accurate.

Optionally, when acquiring the sample speaking style data based on the sample facial expression data, taking one user as an example, each frame image in at least one frame image representing sample facial expression data of the user is judged to determine a speaking style of the user and obtain speaking style data of the user, thus preserving the sample facial expression data of the user as possible. For example, the speaking style data includes "exaggeration", "gentleness" and the like.

Step 202. The terminal performs feature extraction on the sample audio data to obtain a sample audio feature.

In some embodiments, step 202 includes: the terminal performs feature extraction on the sample audio data based on a preset model, where a feature from an intermediate layer of the preset model is used as the sample audio feature. Optionally, the preset model includes an input layer, an intermediate layer including a plurality of data processing sublayers, and an output layer. Optionally, when acquiring the sample audio feature, a feature from a data processing sublayer in the intermediate layer may be used as the sample audio feature.

Optionally, due to various audio receiving devices used for collecting data from the user and various audio sources of the user, there is at least one audio data format in the collected sample audio data, which is not conducive to unified processing of the sample audio data, bringing great inconvenience to processing of the sample audio data. To resolve the foregoing technical problem, a generalization audio feature extraction mode is adopted to perform feature extraction on the sample audio data. For example, an ASR (automatic speech recognition) model is used to perform feature extraction on the sample audio data to obtain a sample audio feature.

Optionally, any one of a MASR (Magical Automatic Speech Recognition) model, a deepspeech (Deep Speech) model, and other models may be used to perform feature extraction on the sample audio data.

Optionally, there is at least one language in the sample audio data, which corresponds to at least one audio receiving device and at least one user. Therefore, when performing feature extraction on the sample audio data, a feature from an intermediate layer of the MASR model is used as the sample audio feature, thereby improving generalization of feature extraction and further enhancing efficiency of feature extraction.

Step 203. The terminal performs convolution on the sample audio feature based on a to-be-trained audio-driven three-dimensional facial animation model to obtain an initial audio feature, and performs encoding on the sample speaking style data based on the to-be-trained audio-driven three-dimensional facial animation model to obtain a sample speaking style feature.

Before step 203, the method further includes that the terminal inputs the sample audio feature, the sample speaking style data, and a corresponding sample BS value to the to-be-trained audio-driven three-dimensional facial animation model.

Figure 2C:
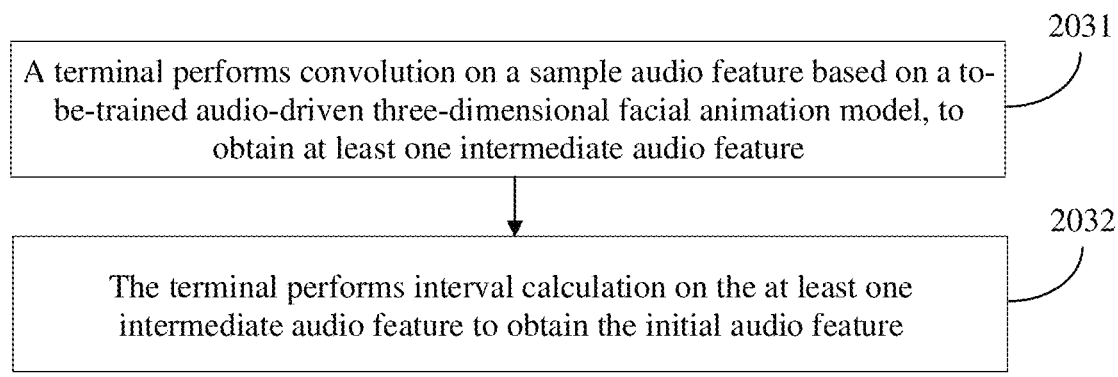
FIG. 2C is a second exemplary schematic flowchart of an audio-driven three-dimensional facial animation model generation method according to an embodiment of the present application.

In some embodiments, as shown in FIG. 2C, step 203 includes the following steps.

Step 2031. The terminal performs convolution on the sample audio feature based on the to-be-trained audio-driven three-dimensional facial animation model, to obtain at least one intermediate audio feature.

In some embodiments, the terminal acquires at least one convolution group when performing convolution on the sample audio feature based on the to-be-trained audio-driven three-dimensional facial animation model. All convolution groups in the at least one convolution group share a hyper-parameter, and each includes at least one convolution layer. Each convolution group in the least one convolution group is provided with a convolutional calculation channel, which is used for performing calculation on a channel of an input feature (a part of the sample audio feature).

Step 2032. The terminal performs interval calculation on the at least one intermediate audio feature to obtain the initial audio feature.

In some embodiments, each of the at least one convolution layer includes at least one convolution kernel. Although different convolution kernels correspond to different convolution effects, due to an effective convolution parameter, there may be certain correlation between intermediate audio features corresponding to different convolution groups in the least one convolution group, thereby resulting in overfitting occurring when the calculation is performed on the intermediate audio features corresponding to different convolution groups, which reduces accuracy of calculation. To resolve the foregoing problem and improve the accuracy of calculation, the terminal performs interval calculation on the at least one intermediate audio feature to obtain the initial audio feature.

Figure 2D:
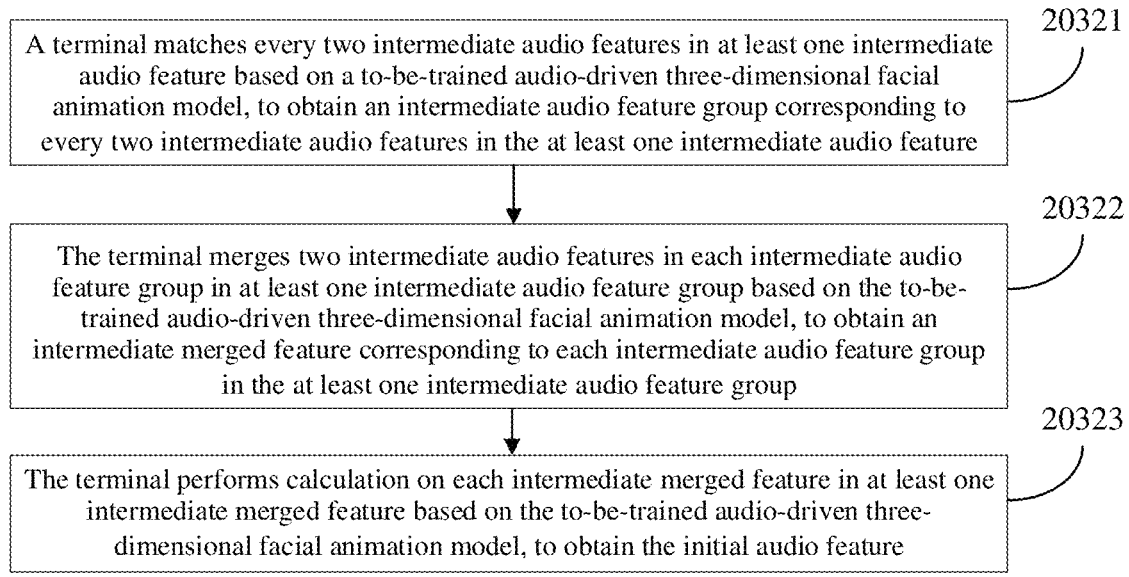
FIG. 2D is a third exemplary schematic flowchart of an audio-driven three-dimensional facial animation model generation method according to an embodiment of the present application.

In some embodiments, as shown in FIG. 2D, step 2032 includes the following steps.

Step 20321. The terminal matches every two intermediate audio features in the at least one intermediate audio feature based on the to-be-trained audio-driven three-dimensional facial animation model, to obtain an intermediate audio feature group corresponding to every two intermediate audio features in the at least one intermediate audio feature, where each intermediate audio feature in the at least one intermediate audio feature corresponds to one convolutional calculation channel, and sequence values of two convolutional calculation channels corresponding to the intermediate audio feature group are not adjacent to each other.

In some embodiments, description is made for one convolution group in the at least one convolution group as an example. When performing convolution on the corresponding input feature, the convolution group performs calculation on the corresponding convolutional calculation channel and a channel of the corresponding input feature, to obtain a convolution result of the input feature. Optionally, description is made for a part of the sample audio feature as an example. When performing convolution on the part of the sample audio feature, the convolution group performs calculation on the convolutional calculation channel corresponding to the convolution group and a channel corresponding to the part of the sample audio feature, to obtain an intermediate audio feature corresponding to the part of the sample audio feature.

Optionally, description is made for two convolution groups in the at least one convolution group as an example. If sequence values of convolutional calculation channels corresponding to the two convolution groups are adjacent to each other, overfitting may occur when calculation is performed on two intermediate audio features corresponding to the two convolution groups. Optionally, to resolve the problem of overfitting, in the embodiments of the present application, for the sequence value of the convolutional calculation channel of the convolution group corresponding to each intermediate audio feature in the at least one intermediate audio feature, a pairwise matching is performed on each of the at least one intermediate audio feature to obtain at least one intermediate audio feature group.

In some embodiments, description is made for one intermediate audio feature group in the at least one intermediate audio feature group as an example. This intermediate audio feature group corresponds to two convolution groups, which correspond to two convolutional calculation channels. If the two convolutional calculation channels are not adjacent to each other, that is, a difference between sequence values of the two convolutional calculation channels is greater than "1", overfitting would not occur when calculation is performed on two intermediate audio features in the intermediate audio feature group, thereby resolving the problem of overfitting.

In some embodiments, when matching every two intermediate audio features in the at least one intermediate audio feature according to a preset first matching rule, a difference between sequence values of convolutional calculation channels corresponding to every two intermediate audio features in the at least one intermediate audio feature is greater than "1". Optionally, description is made for two intermediate audio feature groups in the at least one intermediate audio feature group as an example. Two intermediate audio feature groups in which a convolutional calculation channel of a convolution group to which one intermediate audio feature corresponds has a sequence value "1" and a convolutional calculation channel of a convolution group to which the other intermediate audio feature corresponds has a sequence value "6" are matched to obtain an intermediate audio feature group.

Step 20322. The terminal merges two intermediate audio features in each intermediate audio feature group in at least one intermediate audio feature group based on the to-be-trained audio-driven three-dimensional facial animation model, to obtain an intermediate merged feature corresponding to each intermediate audio feature group in the at least one intermediate audio feature group.

Through analysis of step 20321, it may be learned that each intermediate merged feature in at least one intermediate merged feature obtained in step 20322 does not have the problem of overfitting, so that accuracy of the at least one intermediate merged feature is improved.

Step 20323. The terminal performs calculation on each intermediate merged feature in at least one intermediate merged feature based on the to-be-trained audio-driven three-dimensional facial animation model, to obtain the initial audio feature.

In some embodiments, during training of the to-be-trained audio-driven three-dimensional facial animation model, iterative training is required to improve accuracy of a trained audio-driven three-dimensional facial animation model. Optionally, to make convolution results of different convolution groups in the at least one convolution group be fused more evenly, after step 20323 is completed and before a next round of training, every two intermediate audio features in the at least one intermediate audio feature may be re-matched according to a preset second matching rule, to obtain an intermediate audio feature group corresponding to every two intermediate audio features in the at least one intermediate audio feature.

Optionally, after step 20323 is completed, during a process of a next round of training, every two intermediate audio features in the at least one intermediate audio feature may be re-matched according to a preset third matching rule, to obtain an intermediate audio feature group corresponding to every two intermediate audio features in the at least one intermediate audio feature.

Optionally, description is made for two intermediate audio feature groups in the at least one intermediate audio feature group as an example. Two intermediate audio feature groups in which a convolutional calculation channel of a convolution group to which one intermediate audio feature corresponds has a sequence value "1" and a convolutional calculation channel of a convolution group to which the other intermediate audio feature corresponds has a sequence value "3" are matched to obtain an intermediate audio feature group.

In step 20323, since there is no overfitting for each intermediate merged feature in the at least one intermediate merged feature, overfitting neither occurs to the sample audio feature obtained based on each intermediate merged feature in the at least one intermediate merged feature. Thus, accuracy of the sample audio feature is improved.

In some embodiments, step 203 includes: the terminal performs one-hot encoding on the sample speaking style data based on the to-be-trained audio-driven three-dimensional facial animation model, to obtain the sample speaking style feature.

It should be noted that one-hot encoding is a conventional encoding manner, and a process of one-hot encoding is not described in the embodiments of the present application.

Step 204. The terminal performs encoding on the initial audio feature and the sample speaking style feature based on the to-be-trained audio-driven three-dimensional facial animation model, to obtain an output blend shape value.

Figure 2E:
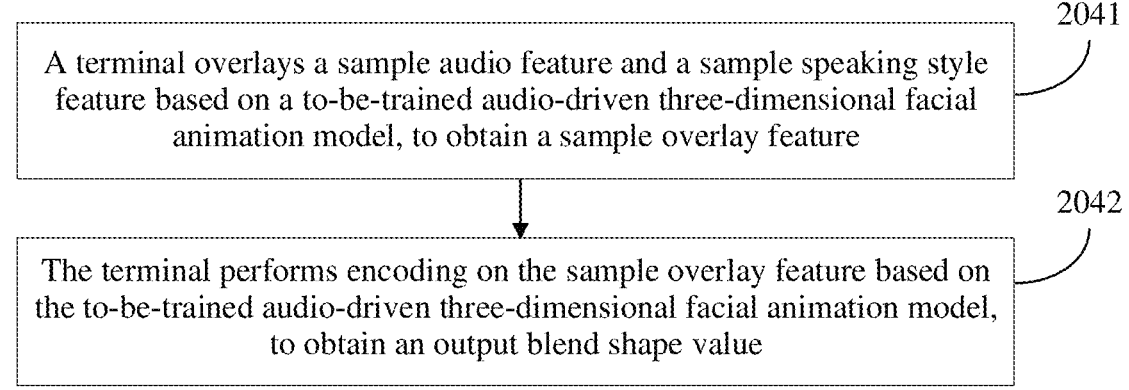
FIG. 2E is a fourth exemplary schematic flowchart of an audio-driven three-dimensional facial animation model generation method according to an embodiment of the present application.

In some embodiments, as shown in FIG. 2E, step 204 includes the following steps.

Step 2041. The terminal overlays the sample audio feature and the sample speaking style feature based on the to-be-trained audio-driven three-dimensional facial animation model, to obtain a sample overlay feature.

In step 2041, the sample audio feature and the sample speaking style feature are overlaid in a channel dimension based on the to-be-trained audio-driven three-dimensional facial animation model, so as to ensure that the sample overlay feature includes rich audio information, and also includes personalisation information of the user that corresponds to the sample overlay feature, thereby achieving better reproduction of lip-sync animations and facial expressions.

Step 2042. The terminal performs encoding on the sample overlay feature based on the to-be-trained audio-driven three-dimensional facial animation model, to obtain the output blend shape value.

Figure 2F:
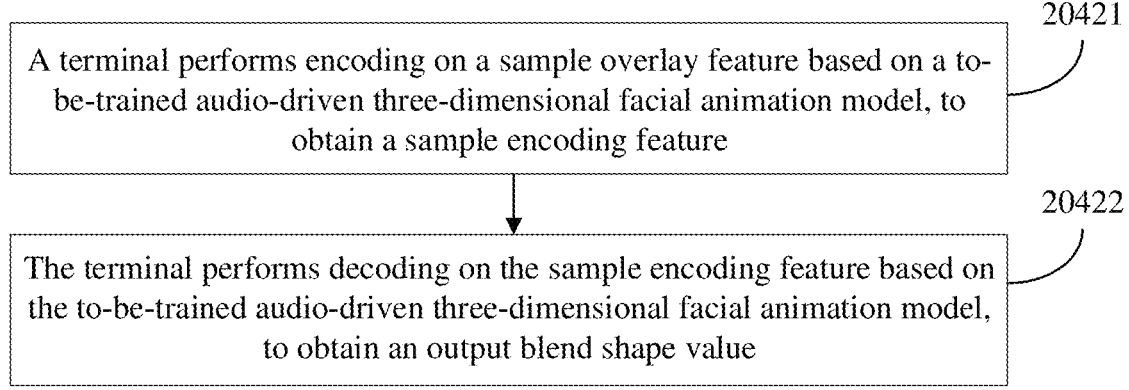
FIG. 2F is a fifth exemplary schematic flowchart of an audio-driven three-dimensional facial animation model generation method according to an embodiment of the present application.

In some embodiments, as shown in FIG. 2F, step 2042 includes the following steps.

Step 20421. The terminal performs encoding on the sample overlay feature based on the to-be-trained audio-driven three-dimensional facial animation model, to obtain a sample encoding feature.

In some embodiments, the terminal performs encoding on the sample overlay feature based on a preset encoding model.

Optionally, in the process of performing encoding on the sample overlay feature based on the preset encoding model, the sample overlay feature is divided into different levels, each of which represents a different granularity. For example, downsampling may be gradually performed on the sample overlay feature to obtain representations at different levels.

Optionally, for a level, the preset encoding model uses a separate self-attention mechanism to capture an internal relationship of that level. The self-attention at this level performs calculation on a weight matrix based on a position, and then multiplies the weight matrix with a value matrix within this level, to obtain self-attention representation within this level. Self-attention representations at different levels are connected together, so that the preset encoding model may simultaneously pay attention to information of different granularities. Optionally, self-attention representations at different levels may be connected together through concatenation or weighted averaging.

Optionally, different levels may interact with each other, so that the preset encoding model can simultaneously capture features of at least one granularity, thereby improving performance of the preset encoding model.

Optionally, the preset encoding model compresses model parameters by means of patient knowledge distillation, so as to maintain performance while minimizing a quantity of parameters as possible, and learn a more concise representation from a teacher model. Second, feedforward neural network layers are decreased while more self-attention mechanisms (such as hierarchical self-attention mechanisms that have processed information of different granularities) are added, so that the preset encoding model can better understand the input feature. In addition, unnecessary encoder and decoder layers are reduced, resulting in a decrease in a size of the preset encoding model and an increase in an inference speed. Thus, an impact relationship between labels may be better understood.

Optionally, the preset encoding model may be an X-transformer (eXtreme Multi-label Text Classification (XMC) transformer with fine-tuned depth).

It should be noted that the manner of patient knowledge distillation and the teacher model are conventional manners or models, and details are not described in the embodiments of the present application.

It may be learned from the foregoing analysis that when the sample overlay feature is encoded based on the improved preset encoding model, a high-accuracy sample encoding feature may be obtained more quickly.

Step 20422. The terminal performs decoding on the sample encoding feature based on the to-be-trained audio-driven three-dimensional facial animation model, to obtain the output blend shape value.

In some embodiments, decoding may be performed on the sample encoding feature based on a decoder of the transformer, to obtain the output blend shape value.

It should be noted that the decoder of the transformer performs decoding on the sample encoding feature according to a conventional decoding algorithm. The process of performing decoding on the sample encoding feature is not described in the embodiments of the present application.

Step 205. The terminal performs calculation on the sample blend shape value and the output blend shape value to obtain a loss function value.

In some embodiments, the calculation is performed on the sample blend shape value and the output blend shape value according to a preset loss function, to obtain the loss function value. Optionally, the preset loss function may be an LI loss function (an absolute error loss function).

Optionally, to improve accuracy of the trained audio-driven three-dimensional facial animation model, the calculation is performed on first-to-third-order errors. The first-to-third-order errors include a reconstruction error, a speed error, and an acceleration error.

Step 206. The terminal updates a model parameter of the to-be-trained audio-driven three-dimensional facial animation model based on the loss function value.

In some embodiments, in step 201, at least one piece of sample data may be acquired. After the at least one piece of sample data is acquired, steps 202 to 206 are repeated to perform iterative training on the to-be-trained audio-driven three-dimensional facial animation model based on the at least one piece of sample data, thereby improving the accuracy of the trained audio-driven three-dimensional facial animation model.

In some embodiments, after the trained audio-driven three-dimensional facial animation model is obtained, to-be-processed audio is acquired by the audio receiving device. Feature extraction is performed on the to-be-processed audio based on the preset model, to obtain a to-be-processed audio feature and acquire preset speaking style data. The to-be-processed audio feature and the preset speaking style data are input into the trained audio-driven three-dimensional facial animation model to output at least one corresponding BS value. Each frame image corresponds to at least one BS value, and images with different complexities correspond to different quantities of BS values.

In some embodiments, after being obtained, the corresponding BS value is input into a preset unreal engine, in which there are various preset scenes. After receiving the BS value, the preset unreal engine renders at least one frame of target image (including high-accuracy lip-syncs and facial expressions) corresponding to the to-be-processed audio feature onto the video display device based on the various preset scenes and the BS value, where the facial expression of a person on the target image is consistent with the preset speaking style data. For example, if the preset speaking style data is "exaggeration", the person on the target image corresponds to an exaggerated facial expression.

It should be noted that the foregoing embodiments are described for an example in which the embodiments are applied to a terminal. In addition, the embodiments of the present application may also be applied to a server.

In the embodiments of the present application, the sample data of the user is acquired, including the sample audio data, the sample speaking style data, and the sample blend shape value corresponding to the sample audio data. The sample speaking style data represents facial expression data of the user, so as to merge personalisation data of the user with the sample audio data while preserving the personalisation data of the user as possible. Training is performed on the to-be-trained audio-driven three-dimensional facial animation model based on the sample data. The obtained audio-driven three-dimensional facial animation model that has been trained can output a high-accuracy BS value, thereby improving the accuracy of the audio-driven three-dimensional facial animation technology. In addition, the output high-accuracy BS value is inputted into a preset unreal engine enables the preset unreal engine to render high-accuracy lip-syncs and facial expressions onto a video display device, thereby achieving high-accuracy reproduction of both lip-syncs and facial expressions. In this way, the audio-driven three-dimensional facial animation technology can be widely applied to scenes having high requirements on expression accuracy, such as production of movie and television works.

Figure 3:
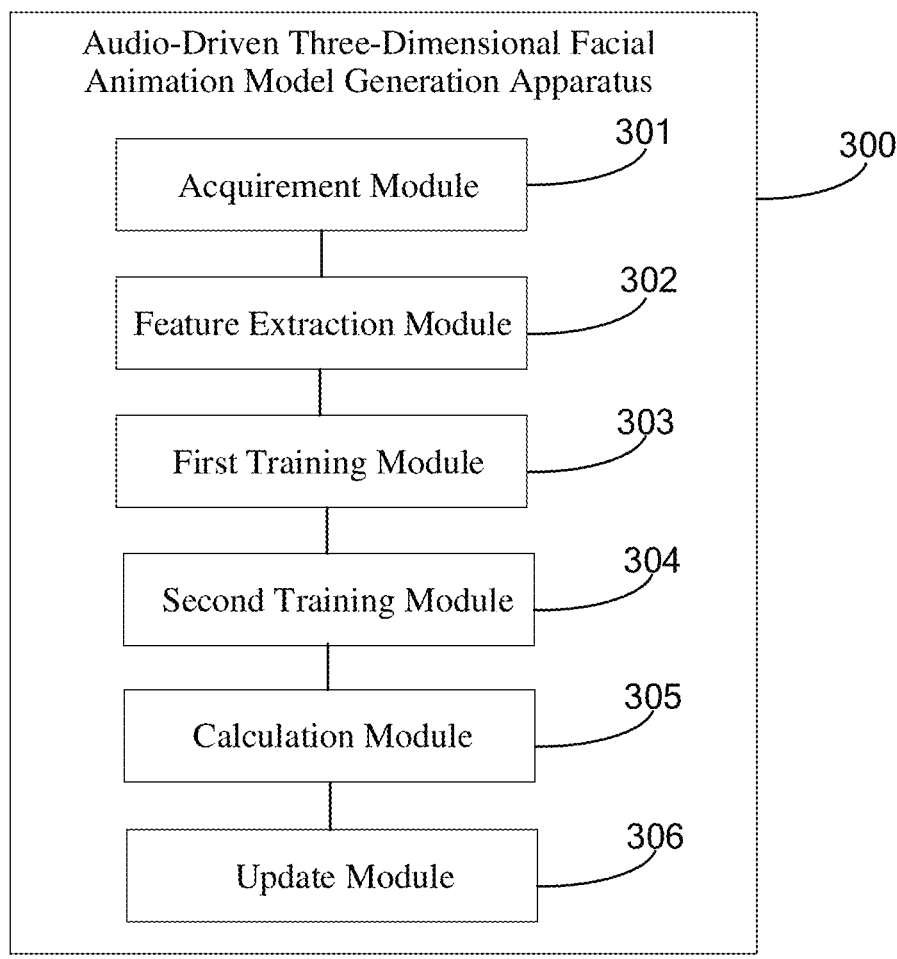
FIG. 3 is a schematic diagram of a structure of an audio-driven three-dimensional facial animation model generation apparatus according to an embodiment of the present application.

FIG. 3 is a schematic diagram of a structure of an audio-driven three-dimensional facial animation model generation apparatus 300 according to an embodiment of the present application, including:

- an acquirement module 301, configured to acquire sample data, where the sample data includes sample audio data, sample speaking style data, and a sample blend shape value, where the sample audio data and the sample speaking style data belong to a same user, and the sample blend shape value is obtained by preprocessing the sample audio data;
- a feature extraction module 302, configured to perform feature extraction on the sample audio data to obtain a sample audio feature;
- a first training module 303, configured to perform convolution on the sample audio feature based on a to-be-trained audio-driven three-dimensional facial animation model to obtain an initial audio feature, and perform encoding on the sample speaking style data based on the to-be-trained audio-driven three-dimensional facial animation model to obtain a sample speaking style feature;
- a second training module 304, configured to perform encoding on the initial audio feature and the sample speaking style feature based on the to-be-trained audio-driven three-dimensional facial animation model, to obtain an output blend shape value;
- a calculation module 305, configured to perform calculation on the sample blend shape value and the output blend shape value to obtain a loss function value; and
- an update module 306, configured to update a model parameter of the to-be-trained audio-driven three-dimensional facial animation model based on the loss function value.

In a possible implementation, the feature extraction module 302 includes:

- a feature extraction unit, configured to perform feature extraction on the sample audio data based on a preset model, wherein a feature from an intermediate layer of the preset model is used as the sample audio feature.

In a possible implementation, the first training module 303 includes:

- a convolution unit, configured to perform convolution on the sample audio feature based on the to-be-trained audio-driven three-dimensional facial animation model, to obtain at least one intermediate audio feature; and
- an interval calculation unit, configured to perform interval calculation on the at least one intermediate audio feature to obtain the initial audio feature.

In a possible implementation, the interval calculation unit includes:

- a first matching subunit, configured to match every two intermediate audio features in the at least one intermediate audio feature based on the to-be-trained audio-driven three-dimensional facial animation model, to obtain an intermediate audio feature group corresponding to every two intermediate audio features in the at least one intermediate audio feature, where channel sequence values of two intermediate audio features in the intermediate audio feature group are not adjacent to each other;
- a merging subunit, configured to merge two intermediate audio features in each intermediate audio feature group in at least one intermediate audio feature group based on the to-be-trained audio-driven three-dimensional facial animation model, to obtain an intermediate merged feature corresponding to each intermediate audio feature group in the at least one intermediate audio feature group; and
- a calculation subunit, configured to perform calculation on each intermediate merged feature in at least one intermediate merged feature based on the to-be-trained audio-driven three-dimensional facial animation model, to obtain the initial audio feature.

In a possible implementation, the first training module 303 includes:

- a one-hot encoding module, configured to perform one-hot encoding on the sample speaking style data based on the to-be-trained audio-driven three-dimensional facial animation model, to obtain the sample speaking style feature, where the sample speaking style feature is used for representing a speaking style f the user.

In a possible implementation, the second training module 304 includes:

- an overlaying unit, configured to overlay the sample audio feature and the sample speaking style feature based on the to-be-trained audio-driven three-dimensional facial animation model, to obtain a sample overlay feature; and
- an encoding unit, configured to perform encoding on the sample overlay feature based on the to-be-trained audio-driven three-dimensional facial animation model, to obtain the output blend shape value.

In a possible implementation, the encoding unit includes:

- an encoding subunit, configured to perform encoding on the sample overlay feature based on the to-be-trained audio-driven three-dimensional facial animation model, to obtain a sample encoding feature; and
- a decoding subunit, configured to perform decoding on the sample encoding feature based on the to-be-trained audio-driven three-dimensional facial animation model, to obtain the output blend shape value.

It should be noted that, for performing of the corresponding steps by the audio-driven three-dimensional facial animation model generation apparatus provided in the foregoing embodiments, description is made only by division of the foregoing functional modules as an example. In practical applications, the foregoing functions may be allocated to be performed by different functional modules as needed. In other words, an internal structure of a device may be divided into different functional modules to complete all or some of the functions described above. In addition, the audio-driven three-dimensional facial animation model generation apparatus provided in the foregoing embodiments belongs to a same concept as the embodiments of the audio-driven three-dimensional facial animation model generation method. For details of a specific implementation process, reference may be made to the method embodiments, and details are not described herein again.

In the embodiments of the present application, the sample data of the user is acquired, including the sample audio data, the sample speaking style data, and the sample blend shape value corresponding to the sample audio data, where the sample speaking style data represents facial expression data of the user, so as to merge personalisation data of the user with the sample audio data while preserving the personalisation data of the user as possible. The training may be performed on the to-be-trained audio-driven three-dimensional facial animation model based on the sample data, and the obtained audio-driven three-dimensional facial animation model that has been trained can output a high-accuracy BS value, thereby improving accuracy of the audio-driven three-dimensional facial animation technology. In addition, inputting of the output high-accuracy BS value into the preset unreal engine enables the preset unreal engine to render the high-accuracy lip-syncs and facial expressions onto the video display device, thereby achieving high-accuracy reproduction of both lip-syncs and facial expressions. In this way, the audio-driven three-dimensional facial animation technology can be widely applied to scenes having high requirements on expression accuracy, such as production of movie and television works.

An embodiment of the present application further provides an electronic device, including a processor, a memory, and a computer program stored in the memory and configured to be executed by the processor. The processor executes the computer program to implement the audio-driven three-dimensional facial animation model generation method.

Figure 4:
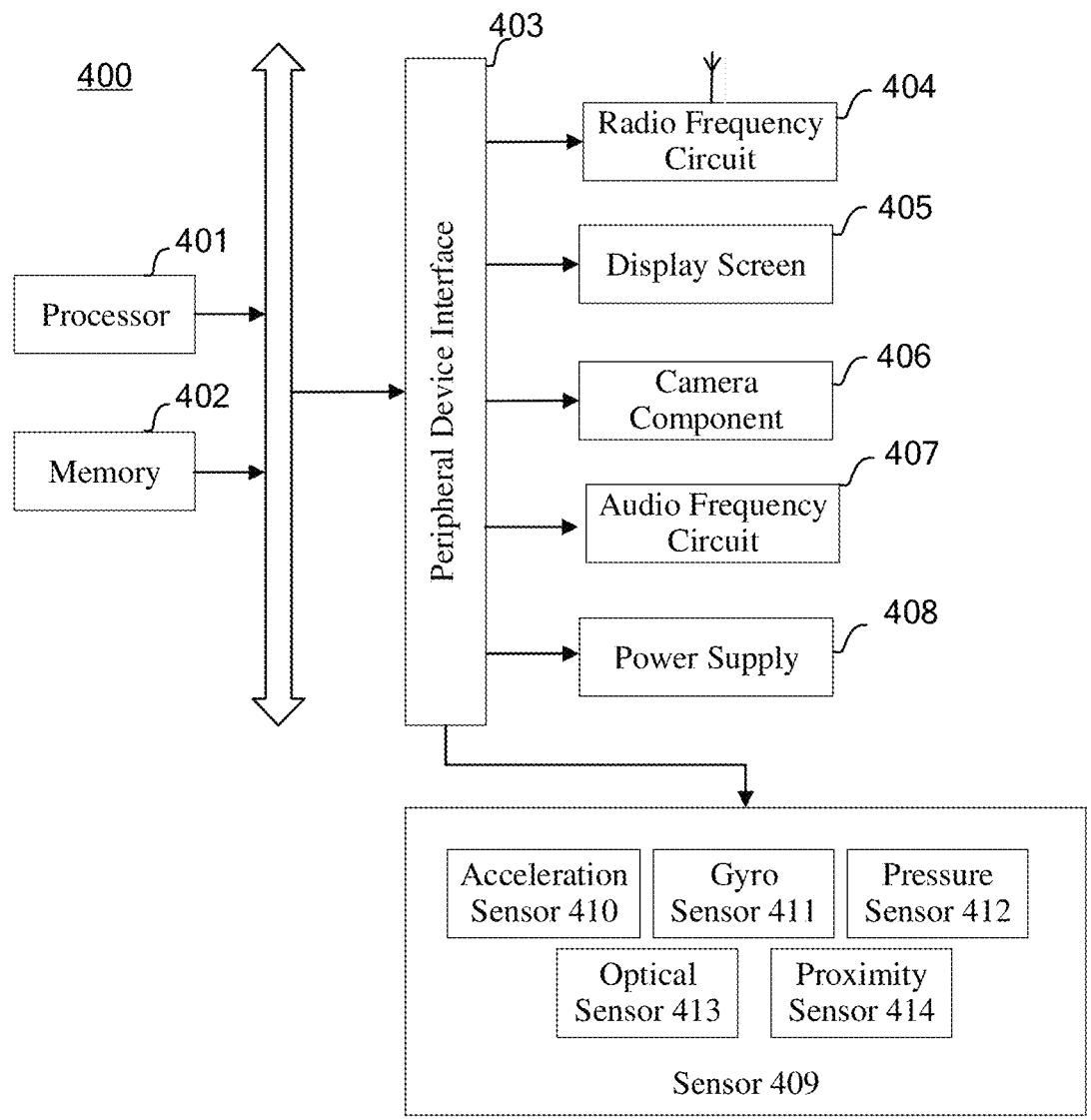
FIG. 4 is a schematic diagram of a structure of a terminal according to an embodiment of the present application.

For example, the electronic device is a terminal. FIG. 4 is a schematic diagram of a structure of a terminal according to an embodiment of the present application. Referring to FIG. 4, a terminal 400 may be a smartphone, a tablet computer, an MP3 (moving picture experts group audio layer III) player, an MP4 (moving picture experts group audio layer IV) player, a laptop, or a desktop computer. The terminal 400 may also be referred to a user device, a portable terminal, a laptop terminal, a desktop terminal, or the like.

Typically, the terminal 400 includes a processor 401 and a memory 402.

The processor 401 may include one or more processing cores, for example, a 4-core processor. The processor 401 may be implemented in at least one hardware form of a DSP (Digital Signal Processor), a FPGA (field programmable gate array), or a PLA (programmable logic array). The processor 401 may also include a main processor and a coprocessor. The main processor is a processor used to process data in an awake state, and is also referred to as a CPU (central processing unit). The coprocessor is a low power-consuming processor used to process data in a standby state. In some embodiments, the processor 401 may be integrated with a GPU (Graphics Processing Unit), which is responsible for rendering and drawing content required to be displayed on a display screen. In some embodiments, the processor 401 may also include an AI (Artificial Intelligence) processor, which is configured to process computational operations related to machine learning.

The memory 402 may include one or more computer readable storage mediums that may be non-transient. The memory 402 may also include a high-speed random access memory and a non-volatile memory, such as one or more magnetic disk storage devices and flash memory devices. In some embodiments, a non-transient computer readable storage medium in the memory 402 is configured to store at least one program code, which is executed by the processor 401 to implement a process implemented by the terminal in the audio-driven three-dimensional facial animation model generation method provided in the method embodiments of the present application.

In some embodiments, the terminal 400 may optionally include a peripheral device interface 403 and at least one peripheral device. The processor 401, the memory 402, and the peripheral device interface 403 may be connected through a bus or a signal line. Each peripheral device may be connected to the peripheral device interface 403 through a bus, a signal line, or a circuit board. Specifically, the peripheral device includes at least one of a radio frequency circuit 404, a display screen 405, a camera component 406, an audio frequency circuit 407, and a power supply 408.

The peripheral device interface 403 may be configured to connect at least one peripheral device related to I/O (input/output) to the processor 401 and the memory 402. In some embodiments, the processor 401, the memory 402, and the peripheral device interface 403 are integrated on a same chip or circuit board; and in some other embodiments, any one or two of the processor 401, the memory 402, and the peripheral device interface 403 may be implemented on separate chips or circuit boards. This is not limited in the embodiments of the present application.

The radio frequency circuit 404 is configured to receive and transmit RF (radio frequency) signals, which are also referred to as electromagnetic signals. The radio frequency circuit 404 communicates with a communication network and other communication devices through electromagnetic signals, and converts an electrical signal into an electromagnetic signal for transmission, or converts a received electromagnetic signal into an electrical signal. In some embodiments, the radio frequency circuit 404 includes an antenna system, a RF transceiver, one or more amplifiers, a tuner, an oscillator, a digital signal processor, a codec chipset, a subscriber identity module card, and the like. The radio frequency circuit 404 may communicate with other terminals according to at least one wireless communication protocol. The wireless communication protocol includes but is not limited to: a metropolitan area network, various generations of mobile communication networks (2G, 3G, 4G, and 5G), a wireless local area network, and/or a WiFi (wireless fidelity) network. In some embodiments, the radio frequency circuit 404 may further include an NFC (Near Field Communication)-related circuit, which is not limited in the present application.

The display screen 405 is configured to display a UI (User Interface), which may include a graphic, text, an icon, a video, and any combination thereof. When the display screen 405 is a touch screen, the display screen 405 also has a capability of acquiring touch signals on or above a surface of the display screen 405. The touch signal may be input as a control signal into the processor 401 for processing. In this case, the display screen 405 may also be configured to provide virtual buttons and/or virtual keyboards, which are also referred to as soft buttons and/or soft keyboards. In some embodiments, there may be one display screen 405 that is disposed on a front panel of the terminal 400. In some other embodiments, there may be at least two display screens 405, which are respectively disposed on different surfaces of the terminal 400 or are designed in a folded manner. In some other embodiments, the display screen 405 may be a flexible display screen, which is disposed on a curved or folded surface of the terminal 400. The display screen 405 even may be disposed to have a non-rectangular irregular shape, that is, may be an irregular screen. The display screen 405 may be made of materials such as an LCD (Liquid Crystal Display) and an OLED (Organic Light-Emitting Diode).

The camera component 406 is configured to capture images or videos. In some embodiments, the camera component 406 includes a front-facing camera and a rear-facing camera. Typically, the front-facing camera is disposed on a front panel of the terminal, and the rear-facing camera is disposed on a back surface of the terminal. In some embodiments, there are at least two rear-facing cameras, each of which is any one of a main camera, a depth-of-field camera, a wide-angle camera, and a long-focus camera, so as to achieve fusion of the main camera and the depth-of-field camera to implement a background blurring function, and achieve fusion of the main camera and the wide-angle camera to implement panoramic shooting, a VR (Virtual Reality) shooting function, or other fusion shooting functions. In some embodiments, the camera component 406 may also include a flashlight, which may be a monochrome temperature flashlight or a bicolor temperature flashlight. The bicolor temperature flashlight refers to a combination of a warm light flashlight and a cool light flashlight, which may be used for light compensation at different color temperatures.

The audio frequency circuit 407 may include a microphone and a speaker. The microphone is configured to collect sound waves from a user and an environment, and convert the sound waves into electrical signals that are input to the processor 401 for processing, or are input to the radio frequency circuit 404 for speech communication. For a purpose of stereo acquisition or noise reduction, there may be a plurality of microphones that are disposed in different parts of the terminal 400. The microphone may also be an array microphone or an omnidirectional acquisition microphone. The speaker is configured to convert electrical signals from the processor 401 or the radio frequency circuit 404 into sound waves. The speaker may be a conventional thin-film speaker or a piezoelectric ceramic speaker. When the speaker is a piezoelectric ceramic speaker, the speaker can not only convert electrical signals into sound waves hearable to humans, but can also convert the electrical signals into sound waves unhearable to humans for purposes such as distance measurement. In some embodiments, the audio frequency circuit 407 may further include a headphone jack.

The power supply 408 is configured to supply power to various components in the terminal 400. The power supply 408 may be an alternating current, a direct current, a disposable battery, or a rechargeable battery. When the power supply 408 includes a rechargeable battery, the rechargeable battery may support wired charging or wireless charging. The rechargeable battery may also be used to support fast charging technologies.

In some embodiments, the terminal 400 may further include one or more sensors 409. The one or more sensors 409 include but are not limited to: an acceleration sensor 410, a gyro sensor 411, a pressure sensor 412, an optical sensor 413, and a proximity sensor 414.

The acceleration sensor 410 may detect magnitude of acceleration on three coordinate axes of a coordinate system established by the terminal 400. For example, the acceleration sensor 410 may be configured to detect component of gravitational acceleration on the three coordinate axes. The processor 401 may control the display screen 405 to display a user page in a horizontal or vertical view based on a gravity acceleration signal collected by the acceleration sensor 410. The acceleration sensor 410 may also be used for collecting motion data of games or users.

The gyro sensor 411 may detect a body direction and a rotation angle of the terminal 400, and may cooperate with the acceleration sensor 410 to collect three-dimensional actions of the user on the terminal 400. Based on the data collected by the gyro sensor 411, the processor 401 may implement the following functions: motion sensing (such as changing a UI according to a tilt operation of the user), image stabilizing during shooting, game control, and inertial navigation.

The pressure sensor 412 may be disposed on a side frame of the terminal 400 and/or at a lower layer of the display screen 405. When disposed on the side frame of the terminal 400, the pressure sensor 412 may detect a grip signal of the user for the terminal 400, and the processor 401 may recognize left and right hands or quickly operates based on the grip signal collected by the pressure sensor 412. When the pressure sensor 412 is disposed at the lower level of the display screen 405, the processor 401 controls an operable control on a UI page based on a pressure operation of the user on the display screen 405. The operable control includes at least one of a button control, a scrollbar control, an icon control, and a menu control.

The optical sensor 413 is configured to collect ambient light intensity. In an embodiment, the processor 401 may control display brightness of the display screen 405 based on the ambient light intensity collected by the optical sensor 413. Specifically, when the ambient light intensity is high, the display brightness of the display screen 405 is increased. When the ambient light intensity is low, the display brightness of the display screen 405 is lowered. In another embodiment, the processor 401 may also dynamically adjust a shooting parameter of the camera component 406 based on the ambient light intensity collected by the optical sensor 413.

The proximity sensor 414, also referred to as a distance sensor, is typically disposed on the front panel of the terminal 400. The proximity sensor 414 is configured to collect a distance between the user and a front surface of the terminal 400. In an embodiment, when the proximity sensor 414 detects that the distance between the user and the front surface of the terminal 400 gradually decreases, the processor 401 controls the display screen 405 to switch from a screen-on state to a screen-off state. When the proximity sensor 414 detects that the distance between the user and the front surface of the terminal 400 gradually increases, the processor 401 controls the display screen 405 to switch from the screen-off state to the screen-on state.

A person skilled in the art may understand that the structure shown in FIG. 4 does not constitute any limitation on the terminal 400. The structure may include more or fewer components than those shown in the FIG. 4, or may combine certain components, or may adopt different component arrangements.

Figure 5:
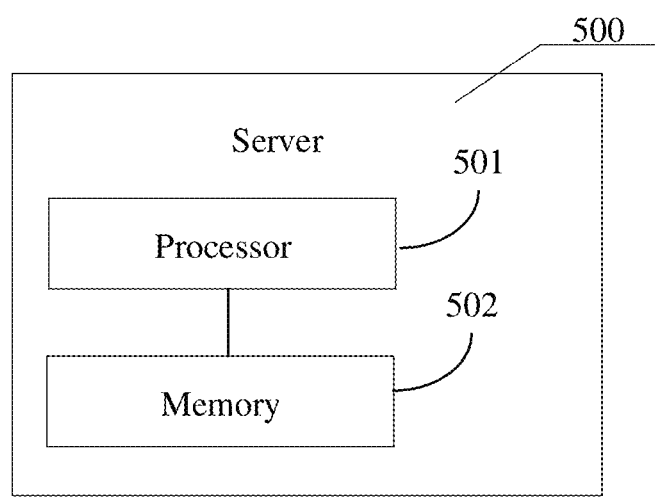
FIG. 5 is a schematic diagram of a structure of a server according to an embodiment of the present application.

For example, the electronic device is a server. FIG. 5 is a schematic diagram of a structure of a server according to an embodiment of the present application. The server 500 may have significant differences due to different configurations or performance, and may include one or more central processing units (CPUs) 501 and one or more memories 502. The one or more memories 502 store at least one computer program, which is loaded and executed by the one or more processors 501 to implement the audio-driven three-dimensional facial animation model generation method described above. Certainly, the server 500 may also have a wired or wireless network interface, a keyboard, and an input/output interface for input and output. The server 500 may also include other components for implementing functions of the device. Details are not described herein.

An embodiment of the present application also provides a computer readable storage medium, which includes a stored computer program. When the computer program is running, a device where the computer readable storage medium is located is controlled to implement the audio-driven three-dimensional facial animation model generation method described above. Optionally, the computer readable storage medium may be a read only memory (ROM), a random access memory (RAM), a compact disc read-only memory (CD-ROM), a magnetic tape, a floppy disk, an optical data storage device, or the like.

Persons of ordinary skills in the art may understand that: all or some of steps for implementing the foregoing embodiments may be completed through hardware, or by instructing relevant hardware through programs. The program may be stored in a computer readable storage medium, and the storage medium may be a read-only memory, a magnetic disk, or an optical disc.

The foregoing description is only optional embodiments of the present application and is not intended to limit the present application. Any modification, equivalent replacement, improvement, and the like made within the spirit and principles of the present application shall fall within the protection scope of the present application.

What is claimed is:

1. An audio-driven three-dimensional facial animation model generation method, comprising:
   acquiring sample data including sample audio data, sample speaking style data, and a sample blend shape value, wherein the sample audio data and the sample speaking style data belong to a same user, the sample speaking style data is used for representing a facial expression of the user, and the sample blend shape value is obtained by preprocessing the sample audio data;
   performing feature extraction on the sample audio data to obtain a sample audio feature;
   performing convolution on the sample audio feature based on the to-be-trained audio-driven three-dimensional facial animation model to obtain at least one intermediate audio feature; matching every two intermediate audio features in the at least one intermediate audio feature based on the to-be-trained three-dimensional facial animation model to obtain an intermediate audio feature group corresponding to every two intermediate audio features in the at least one intermediate audio feature; merging two intermediate audio features in each intermediate audio feature group in at least one intermediate audio feature group based on the to-be-trained audio-driven three-dimensional facial animation model to obtain an initial audio feature, wherein each intermediate audio feature in the at least one intermediate audio feature corresponds to one convolutional calculation channel, and sequence values of two convolutional calculation channels corresponding to the intermediate audio feature group are not adjacent to each other; and performing encoding on the sample speaking style data based on the to-be-trained audio-driven three-dimensional facial animation model to obtain a sample speaking style feature;
   performing encoding on the initial audio feature and the sample speaking style feature based on the to-be-trained audio-driven three-dimensional facial animation model to obtain an output blend shape value;
   performing calculation on the sample blend shape value and the output blend shape value to obtain a loss function value; and
   updating a model parameter of the to-be-trained audio-driven three-dimensional facial animation model based on the loss function value.

2. The method according to claim 1, wherein the performing feature extraction on the sample audio data to obtain a sample audio feature comprises:
   performing feature extraction on the sample audio data based on a preset model, wherein a feature from an intermediate layer of the preset model is used as the sample audio feature.

3. The method according to claim 1, wherein the performing encoding on the sample speaking style data based on the to-be-trained audio-driven three-dimensional facial animation model to obtain a sample speaking style feature comprises:
   performing one-hot encoding on the sample speaking style data based on the to-be-trained audio-driven three-dimensional facial animation model to obtain the sample speaking style feature.

4. The method according to claim 1, wherein the performing encoding on the initial audio feature and the sample speaking style feature based on the to-be-trained audio-driven three-dimensional facial animation model to obtain an output blend shape value comprises:
   overlaying the initial audio feature and the sample speaking style feature based on the to-be-trained audio-driven three-dimensional facial animation model to obtain a sample overlay feature; and
   performing encoding on the sample overlay feature based on the to-be-trained audio-driven three-dimensional facial animation model to obtain the output blend shape value.

5. The method according to claim 4, wherein the performing encoding on the sample overlay feature based on the to-be-trained audio-driven three-dimensional facial animation model to obtain the output blend shape value comprises:
   performing encoding on the sample overlay feature based on the to-be-trained audio-driven three-dimensional facial animation model to obtain a sample encoding feature; and
   performing decoding on the sample encoding feature based on the to-be-trained audio-driven three-dimensional facial animation model to obtain the output blend shape value.

6. An electronic device, wherein the electronic device comprises a processor and a memory, the memory is configured to store at least one program, and the at least one program is loaded and executed by the processor to implement the audio-driven three-dimensional facial animation model generation method according to claim 1.

7. A non-transitory computer readable storage medium, wherein the computer readable storage medium stores at least one program, and the at least one program is loaded and executed by a processor to implement the audio-driven three-dimensional facial animation model generation method according to claim 1.

8. An audio-driven three-dimensional facial animation model generation apparatus, comprising:
   an acquirement module, configured to acquire sample data including sample audio data, sample speaking style data, and a sample blend shape value, wherein the sample audio data and the sample speaking style data belong to a same user, the sample speaking style data is used for representing a facial expression of the user, and the sample blend shape value is obtained by preprocessing the sample audio data;
   a feature extraction module, configured to perform feature extraction on the sample audio data to obtain a sample audio feature;
   a first training module, configured to perform convolution on the sample audio feature based on the to-be-trained audio-driven three-dimensional facial animation model to obtain at least one intermediate audio feature; match every two intermediate audio features in the at least one intermediate audio feature based on the to-be-trained audio-driven three-dimensional facial animation model to obtain an intermediate audio feature group corresponding to every two intermediate audio features in the at least one intermediate audio feature; merge two intermediate audio features in each intermediate audio feature group in at least one intermediate audio feature group based on the to-be-trained audio-driven three-dimensional facial animation model to obtain an initial audio feature, wherein each intermediate audio feature in the at least one intermediate audio feature corresponds to one convolutional calculation channel, and sequence values of two convolutional calculation channels corresponding to the intermediate audio feature group are not adjacent to each other; and perform encoding on the sample speaking style data based on the to-be-trained audio-driven three-dimensional facial animation model to obtain a sample speaking style feature;

a second training module, configured to perform encoding on the initial audio feature and the sample speaking style feature based on the to-be-trained audio-driven three-dimensional facial animation model to obtain an output blend shape value;

a calculation module, configured to perform calculation on the sample blend shape value and the output blend shape value to obtain a loss function value; and an update module, configured to update a model parameter of the to-be-trained audio-driven three-dimensional facial animation model based on the loss function value.

* * * * *